April 23, 1929.  I. B. HUMPHREYS  1,710,480
SPRING
Filed Aug. 13, 1925   2 Sheets-Sheet 1
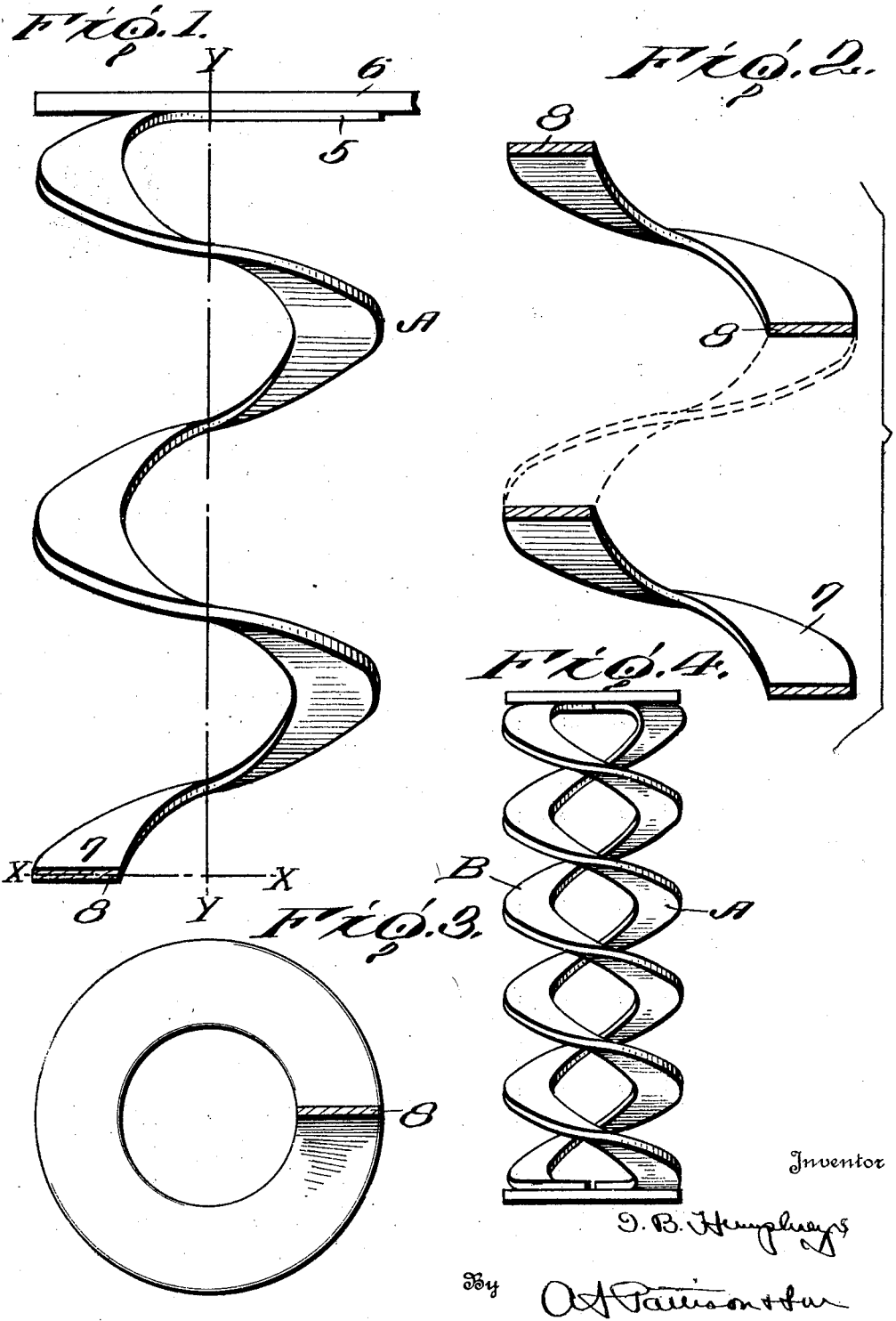

April 23, 1929.　　　I. B. HUMPHREYS　　　1,710,480
SPRING
Filed Aug. 13, 1925　　　2 Sheets-Sheet 2
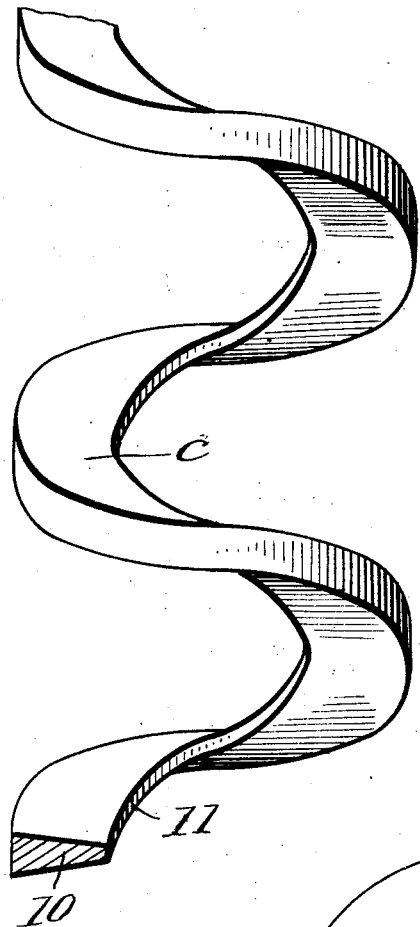
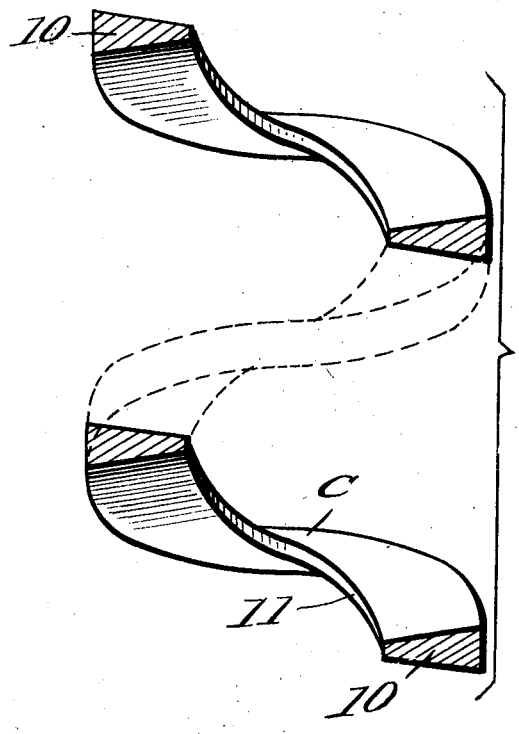
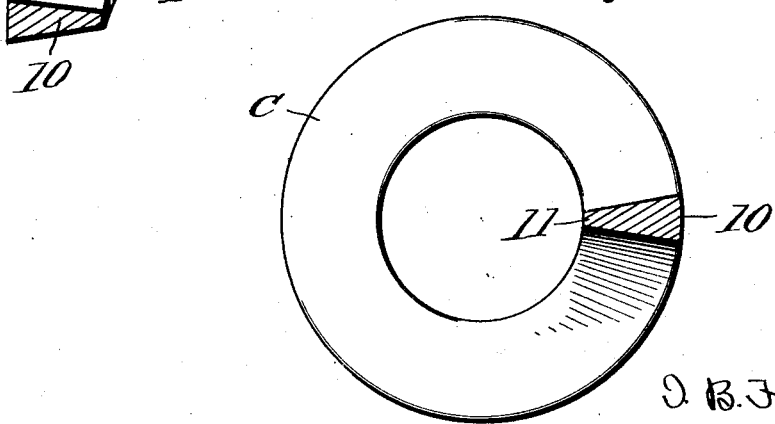
Inventor
I. B. Humphreys
By
Attorneys Patented Apr. 23, 1929.

1,710,480

UNITED STATES PATENT OFFICE.

IRA B. HUMPHREYS, OF DENVER, COLORADO.

SPRING.

Application filed August 13, 1925. Serial No. 50,007.

This invention relates to springs and pertains more particularly to a cylindrical helical spring for producing a motion of rotation.

The primary object of the invention is the provision of a cylindrical helical spring so constructed as to produce rotary motion when compressed.

Another object of the invention is the provision of a cylindrical helical spring made of material oblong in cross section, which is coiled in such a manner as to have the long axis of the oblong material at right angles to the axis of the spring.

A still further object of the invention is the provision of a cylindrical helical spring made of material triangular in cross-section, which is coiled in such a manner as to have the apex or thin edge of the material at the inner peripheral edge of the spring.

A further object of the invention is the provision of a spring of particular construction, coiled in a particular manner, and having one end fixed against rotation whereby when the spring is compressed the same will produce a rotary motion at its free end.

In the drawing:—

Figure 1 is a detailed view in elevation of a spring constructed in accordance with the invention.

Fig. 2 is a vertical sectional view of the spring.

Fig. 3 is a horizontal sectional view of the spring.

Fig. 4 is a view of a modified form of the invention showing the use of two springs.

Fig. 5 is a detailed view in elevation of a spring constructed of material having approximately triangular shape in cross-section.

Fig. 6 is a vertical sectional view taken through Fig. 5.

Fig. 7 is a horizontal sectional view of the spring shown in Fig. 5.

In carrying out the invention there is provided a cylindrical helical spring A having one of its ends 5 suitably fastened to a disc 6 or the like. The disc 6, in the operation of the spring, is intended to be held against rotation while the opposite end 7 of the spring is adapted to be free and it is against this end of the spring that pressure is applied, in any suitable manner, to cause a compression of the spring.

It will of course be readily understood that the end 5 of the spring need not necessarily be attached to a disc but can be attached to any other shaped or formed member which is present in the machine or device to which the spring is applied.

The spring can be compressed in many different ways such as by hydraulic pressure, air pressure, or by some suitable arrangement of levers or cams.

The spring has been designed and perfected primarily for use with hydraulic drills and in devices of this character is used for imparting a rotary motion to the drill bit.

I do not however limit the invention for use to devices of this character as the spring can be used for producing a rotary motion in many other machines or devices where a rotary motion is desired.

The cylindrical helical spring A is composed of a material of an oblong shape in cross section as clearly appears in the sectional views at the point designated by the numeral 8. The spring is coiled in a manner to have the long axis X—X of the spring material at right angles to the central axis Y—Y of the spring (see Fig. 1 of the drawings). With the spring coiled in this manner each helical section, coil or convolution of the spring is parallel to every other coil or convolution. Furthermore both the free end and the fastened end of the spring has its surface at right angles to the central axis of the spring.

The free end 7 of the spring may engage the mechanism or device to be turned by any common or well known means such as slots, grooves, splines, shoulders, knobs, bars, or the equivalent.

The pitch of the spring coil or convolution will vary according to the amount of work to be done by the spring. The number of coils or convolutions of the spring will also vary according to the amount of work to be done by the spring and also be controlled by the amount of pitch of each convolution.

In Fig. 4 a modified form of the invention is shown wherein two cylindrical helical springs, as designated by the numerals A and B, are used. Because of the larger pitch of these springs there is space between each coil or convolution to permit the springs to be mounted in the manner shown in this figure of the drawing. With a construction of this nature the number of coils or convolutions are increased thereby increasing the strength of the device yet at the same time keeping the length of the springs within a given measurement. By thus increasing the number of coils or convolutions and the strength of the spring the amount of work which the spring will produce is increased without lengthening the device.

By experiment, it has been found that when pressure is applied to a cylindrical helical spring constructed as the herein described invention, with one end of the spring fixed and the other end free to rotate, the free end of the spring will rotate in an unwinding direction.

This rotary motion of the spring is due to the fact that the helix, or more correctly, the series of helices formed by the bar of steel or material of which the spring is composed, must follow the curve of the helix formed when the spring is coiled, as the spring is compressed. The resistance of the spring material edgewise is too great to allow changing of this curve by compression so the displacement will be found in another direction. The curve of the helix in the uncompressed spring must necessarily represent a shorter radius than it does when the spring is compressed and the helix approaches a plane because the curve of the spring material does not change edgewise.

Therefore, a spring constructed in accordance with this invention and comprising a certain number of coils in its uncompressed state, will when compressed, form helices of a large diameter and a large circumference and in order to form these large circumferences the spring must uncoil, as it were, or the ends must rotate with respect to one another.

In the foregoing it will be seen that I have provided a cylindrical helical spring which produces a rotary motion, in an unwinding direction in respect to the spring, when one end of the spring is free and one end of the spring is fixed and the spring is subjected to pressure.

It will likewise be understood from the foregoing description that the amount of rotation of the free end of the spring will depend upon the pitch of the spring coils and the amount of pressure applied to the springs. If the elastic limit of the spring material is not reached, when the spring is subjected to end pressure, the spring will rotate the same amount under each successive subjection of the spring to end pressures of equal amount.

Figures 5, 6 and 7 illustrate a cylindrical helical spring coiled in a similar manner as heretofore described of the spring shown in Figs. 1 to 4, inclusive, but, in this instance, the spring C is composed of a material which is approximately triangularly shaped in cross-section, as clearly appears at 10 in the drawing.

It has been found that by making the spring material of an approximately triangular shape in cross-section and coiling the spring so that the apex, or thin edge 11 of the material, is at the inner peripheral edge of the spring, the spring is more durable; the compression limit is increased; the spring is balanced to stand throughout its width an equal amount of compression; and the spring is more efficient, because of the spring being balanced, which gives to the spring a greater rotating power and strength.

It has further been found that a spring of this shape can be subjected to a greater compression force, for the reason that the inner peripheral edge of the spring must be bent on a shorter radius than the outer edge, and by making the inner edge of the spring material thinner, this shorter bend is permitted.

Attention is directed to the fact that in springs coiled and made as described, the springs will produce a rotary motion if they are stretched. When the springs are stretched, however, the rotary motion produced is in an opposite direction to that which is produced when the springs are compressed.

Having thus described my invention what I claim and desire to secure by Letters Patent is:—

1. A device for producing rotary motion, by compression, comprising a spring made of material of an oblong shape in cross section coiled to have the long axis of the spring material at right angles to the axis of the spring, one end of said spring fixed as to rotation and the other end of the spring free as to rotation about its axis, and said spring adapted to be compressed.

2. A device for producing rotary motion by compression, comprising a cylindrical helical spring composed of material of an oblong shape in cross section coiled to have the long axis of the spring material at right angles to the axis of the spring, one end of said spring fixed against rotation and the other end of the spring free to rotate about its axis, whereby when said spring is compressed the free end thereof will rotate about the axis of the spring in an unwinding direction.

3. A device for producing rotary motion by compression, comprising a cylindrical helical spring composed of material of an oblong shape in cross section coiled to have the long axis of the spring material at right angles to the axis of the spring, one end of the spring fixed against rotation and the other end of the spring free to rotate about its axis, and the free end of the spring adapted for connection with the device to be rotated, whereby when the spring is compressed the end free as to rotation will rotate about the axis of the spring in an unwinding direction.

4. A device constructed in accordance with claim 2, wherein the amount of rotation of the free end of the spring is controlled by the pitch of the spring coils and the amount of pressure applied to the spring.

5. A device constructed in accordance with claim 2, wherein each coil of the spring is parallel to the other spring coils.

In testimony whereof I hereunto affix my signature.

IRA B. HUMPHREYS.